(12) United States Patent
Zhang

(10) Patent No.: US 9,742,639 B1
(45) Date of Patent: Aug. 22, 2017

(54) INTELLIGENT NETWORK RESOURCE DISCOVERY AND MONITORING

(71) Applicant: Cavirin Systems, Inc., Santa Clara, CA (US)

(72) Inventor: Gordon Zhang, Cupertino, CA (US)

(73) Assignee: Cavirin Systems, Inc., Santa Clara, CA (US)

( * ) Notice: Subject to any disclaimer, the term of this patent is extended or adjusted under 35 U.S.C. 154(b) by 442 days.

(21) Appl. No.: 13/970,596

(22) Filed: Aug. 20, 2013

(51) Int. Cl.
*G06F 15/173* (2006.01)
*H04L 12/26* (2006.01)

(52) U.S. Cl.
CPC .................. *H04L 43/04* (2013.01)

(58) Field of Classification Search
CPC ...................................... H04L 41/12
USPC ......................................... 709/224
See application file for complete search history.

(56) References Cited

U.S. PATENT DOCUMENTS

| | | | |
|---|---|---|---|
| 2001/0007142 A1* | 7/2001 | Hocevar | H03M 13/4107 714/795 |
| 2002/0013847 A1* | 1/2002 | Fisher | H04L 41/08 709/226 |
| 2005/0047350 A1* | 3/2005 | Kantor | H04L 41/12 370/254 |
| 2005/0180335 A1* | 8/2005 | Lee | H04L 41/0226 370/252 |
| 2006/0206675 A1* | 9/2006 | Sato | G06F 3/0607 711/161 |
| 2006/0223518 A1* | 10/2006 | Haney | H04W 12/08 455/420 |
| 2007/0078951 A1* | 4/2007 | Murai | G06F 9/5016 709/217 |
| 2009/0252085 A1* | 10/2009 | Trachewsky | H04B 7/022 370/328 |
| 2009/0279527 A1* | 11/2009 | Fukuoka | H04L 5/12 370/342 |
| 2010/0131632 A1* | 5/2010 | Dehaan | H04L 41/0803 709/223 |
| 2011/0196959 A1* | 8/2011 | Devarakonda | H04L 67/16 709/224 |
| 2012/0246297 A1* | 9/2012 | Shanker | H04L 67/2842 709/224 |
| 2013/0205013 A1* | 8/2013 | Krco | H04L 41/046 709/224 |
| 2015/0127687 A1* | 5/2015 | Graves | G06F 17/30589 707/803 |

\* cited by examiner

*Primary Examiner* — Kevin Bates
*Assistant Examiner* — Clarence McCray
(74) *Attorney, Agent, or Firm* — Barry N. Young

(57) ABSTRACT

An intelligent multi-level resource discovery and analysis system and method identify and characterize physical, logical and virtual resources of a multi-vendor, multi-class, multi-layer network by automatically generating and sending discovery commands that query resources as to their addresses, identities, characteristics and operational states, and by analyzing responses to the commands to identify continuously and in real time resource vendors, types, operating states, configurations of resources and network topology, and changes to resource and network conditions. Externally entered or dynamically discovered discovery parameters define the types and level of detail of information discovered and analyzed.

19 Claims, 5 Drawing Sheets

# INTELLIGENT NETWORK RESOURCE DISCOVERY AND MONITORING

BACKGROUND

This invention relates generally to discovering, monitoring and managing network infrastructure resources, their status and configurations, and more particularly to automatically discovering, monitoring and managing resources in large multi-vendor, multi-class, and multi-layer enterprise networks and other infrastructures such as data centers and clouds.

In any network, determining resource configurations and monitoring the resources so that failures, configuration changes and network topology changes can be readily detected is a challenging task. In large multi-vendor, multi-class and multi-layer enterprise network infrastructures such as wide area and local area networks, data centers, and cloud-based environments may use a large variety of different types and sources of physical, logical and virtual resources. Discovering, monitoring and managing resources and configurations, particularly identifying resources and assets that are added, replaced or moved, is very difficult and even more challenging. Because such infrastructures are subject to continuous change and reconfiguration, it is difficult to maintain up-to-date information on configurations and resources. This makes troubleshooting and correcting failures, as well as replacing or reconfiguring resources to add new functionality, time-consuming and laborious. IT personnel must frequently spend significant time manually tracing and documenting configurations and resources to establish network baselines and to maintain these continuously updated and current in real time for network management and so that network operations can be monitored and restored in the event of failures. Practically, there are no convenient ways of doing this automatically or easily. There do not exist suitable automated methods and approaches for accomplishing these tasks.

It is desirable to provide systems and methods that address the foregoing and other problems associated with monitoring and management of resources and network infrastructures, and that provide for the automated continuous capture of the behaviors, configurations, and states of resources such as networking devices, non-networking devices, physical devices, logical devices and virtual devices located in multi-vendor, multi-class and multi-layer device infrastructures such as enterprise networks, data centers and public/private/hybrid cloud environments. It is to these ends that the present invention is directed.

SUMMARY OF THE INVENTION

The invention affords systems and methods that provide for the automated continuous discovery and monitoring in real-time of physical, logical and virtual resources in multi-vendor, multi-class and multi-layer network infrastructures to trace and track resource states, runtime operations and network changes. Information as to the discovered resource types and configurations may be stored in a repository along with captured states and time stamps so that they may serve as baselines for comparison and to recover network configuration and operations in the event of failures. The tracing and tracking of resources may be user initiated or performed based upon predetermined events or on predetermined schedules.

The invention affords a network ontology virtualization system and process ("NOVA") that employs a novel algorithm to automatically discover information about the identity and status of physical, logical and virtual resources in a network infrastructure to ensure the integrity of the network, to provide baselines for monitoring network performance and to restore network operations in the event of failures. The invention may employ industry-standard protocols, e.g., Internet Engineering Task Force/Request for Comments (IETF/RFC) protocols and mechanisms to communicate with target resources to identify the resources and to determine their states, characteristics and capture their behaviors and configurations, as well as to trace and track resource states of utilization, runtime operations and changes. The system and method of the invention for discovering and analyzing resources is scalable. It employs predetermined external resource property files that provide the characteristics and parameters of the network resources that are employed in discovering and identifying these resources. As such, the resource property files may be changed and updated over time as needed to afford increased or changed capability without the necessity for recompiling the discovery software processes.

In one aspect, the invention provides a computer-implemented method and system for real-time monitoring of a data communications network having a plurality of resources in which a plurality of first discovery commands are sent to query the resources as to resource address, characteristics and configuration. The responses establish first network and resource conditions. A plurality of second discovery commands are sent subsequently to discover second network and resource conditions, and the first and second conditions are compared to identify changes in conditions.

In other more specific aspects, the discovery commands are constructed to discover different levels of information about the network and resources to determine information at different levels of specificity. The discovery commands are constructed to determine one or more of resource identity, type, vendor, port connections and operational characteristics to establish both operational status of the resources and network topology.

DESCRIPTION OF PREFERRED EMBODIMENTS

The invention is particularly well adapted for use for physical, logical and virtual resource discovery and management in large multi-vendor, multi-class and multi-layer enterprise networks, and will be described in that environment. It will become apparent, however, that this is illustrative of only one utility of the invention and that the invention may be employed with other types of infrastructures and in other environments, such as central or distributed data centers and public, private, hybrid cloud environments.

Figure 1:
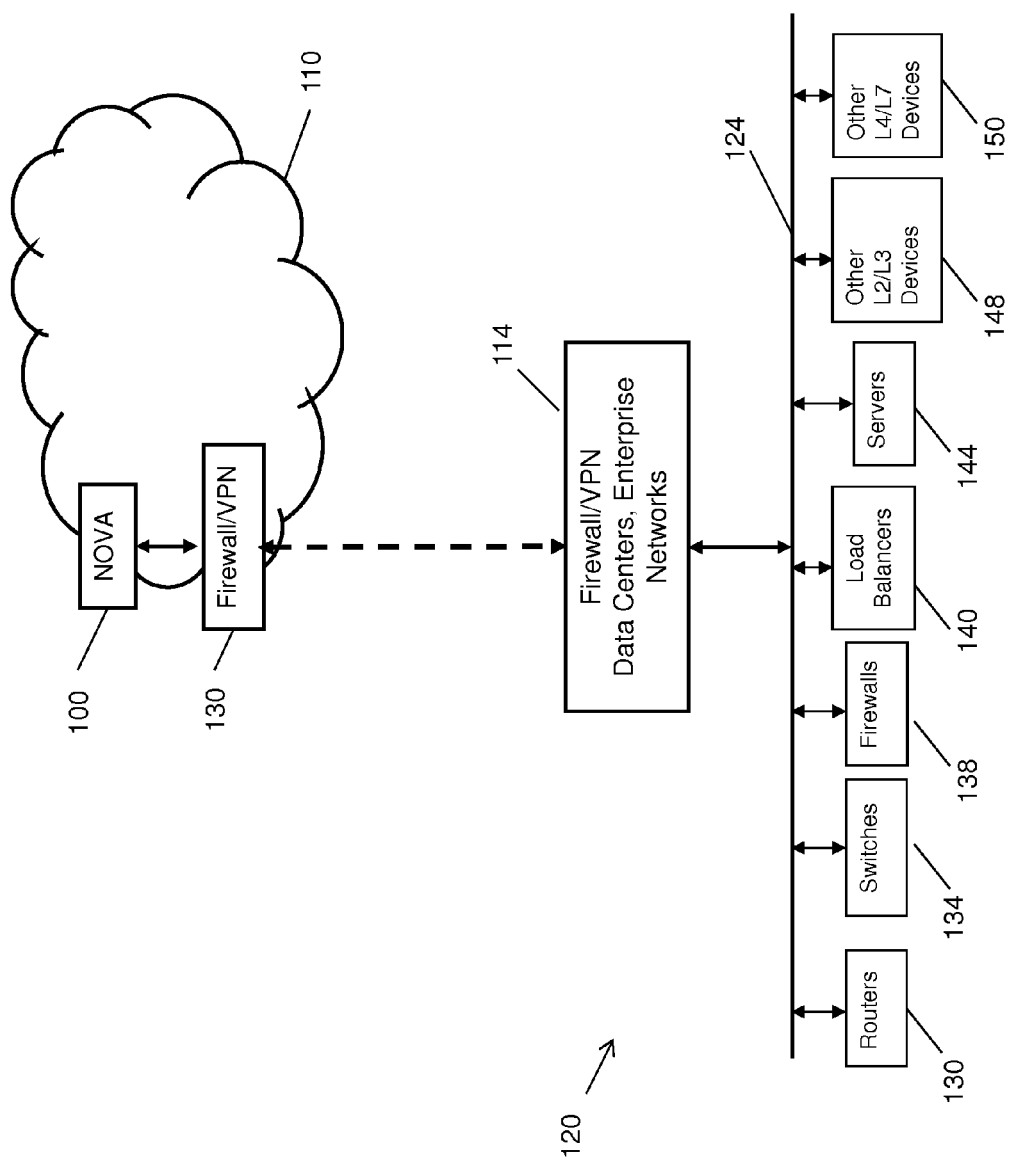
FIG. 1 is a diagrammatic view illustrating an overview of an environment in which the invention may be employed.

FIG. 1 illustrates an environment in which the invention may operate. As will be described, the invention may be located within the infrastructure of a network under test ("NUT"), or it may be external to the NUT and located, for instance, in a cloud. As shown in FIG. 1, an infrastructure resource discovery and characterization system and process 100 (designated as "NOVA") in accordance with the invention may be part of commercial cloud services 110 and be connected to a network under test 120 comprising an Ethernet network 124 via a firewall/virtual private network (VPN) 130 of the cloud and a firewall/virtual private network (VPN) 114 of the network under test. The network under test may be an enterprise network, or a data center or the like, and it may comprise a plurality of different physical, logical and virtual multi-vendor, multi-class and multi-layer resources. The resources may comprise, for example, routers 130, switches 134, firewalls 138, load balancers 140, servers 144, other L2/L3 devices 148 and other L4/L7 devices 150 or software, among others.

Prior to describing the invention in more detail, some of the terms used herein will first be defined. The term "physical resources" refers to physical hardware devices and equipment such as computers, printers, routers, switches, etc. The term "logical resources" refers to software entities which are grouped logically such as VLANs, clusters, domains, server farms, and the like. The term "virtual resources" refers to virtual systems such as virtual networks, virtual switches and virtual machines, for instance. The term "multi-vendor" refers to a resource of a particular type which is available from multiple different manufacturers, such as, for instance, Cisco, Juniper and Hewlett-Packard. The term "multi-class" refers to different types of resources, such as, for instance, routers, switches, firewalls, load balancers, wireless LAN controllers, servers, etc. The term "multi-layer" refers to resources that support one or more different network protocols, such as, for example CDP (Cisco Discovery Protocol), ARP (Address Resolution Protocol), IP (Internet Protocol), TCP (Transmission Control Protocol), UDP (User Datagram Protocol), SNMP (Simple Network Management Protocol), etc., or which operate on any of Layers 2 to 7, i.e., L2 to L7, of the Open Systems Interconnection (OSI) network model of the International Organization for Standardization (ISO).

Figure 2:
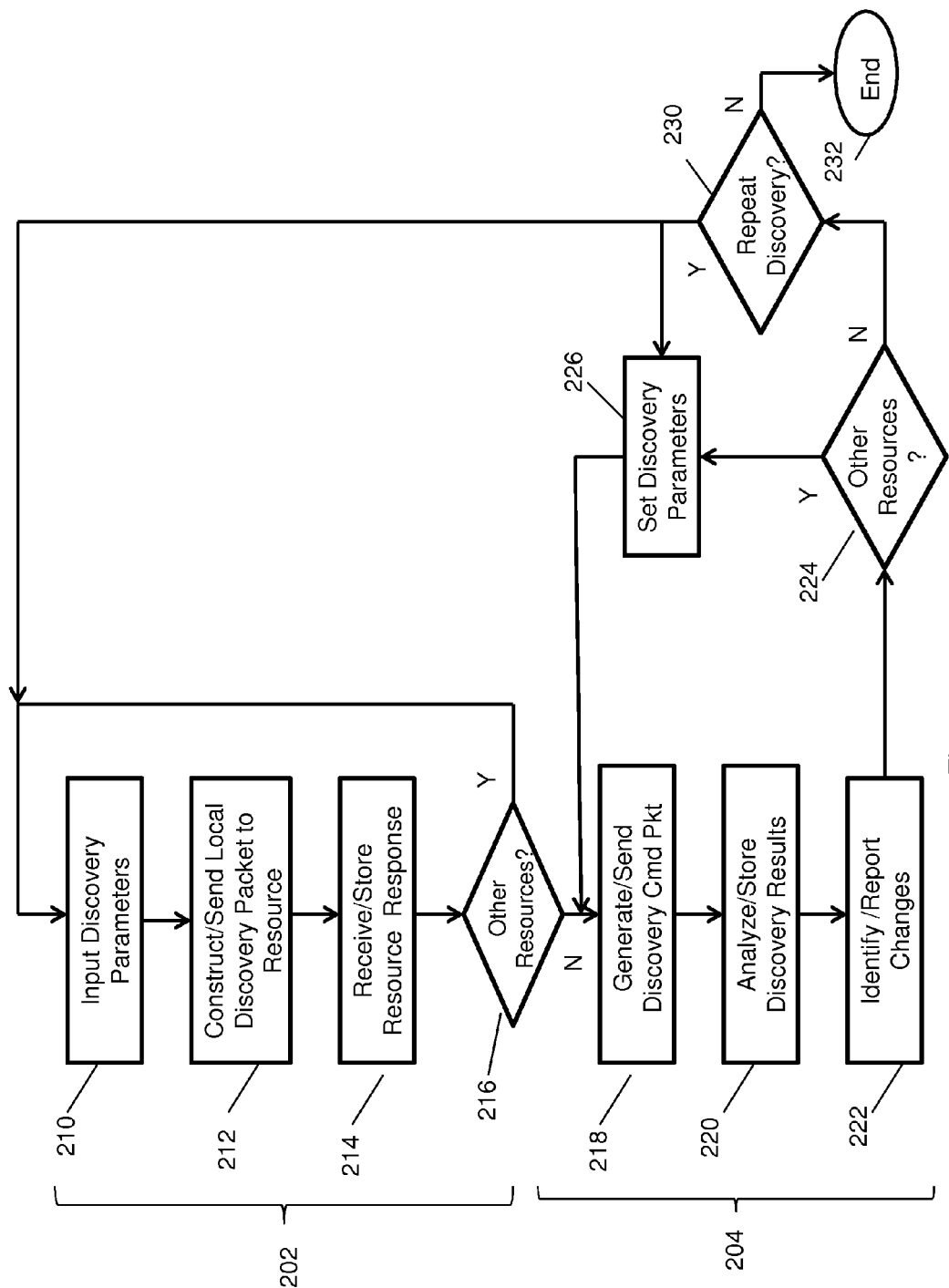
FIG. 2 is a block diagram providing an overview of a discovery and monitoring process in accordance with the invention.

FIG. 2 provides an overview of a resource discovery and analysis method in accordance with the invention. As will be described in more detail below, a system and method in accordance with the invention conduct a discovery and analysis process to determine the constituent resources and characteristics of a NUT. This process may comprise issuing a plurality of commands to the NUT that query the infrastructure resources and interrogate the resources as to their types, identities, properties, characteristics, operating conditions and states, configurations, etc. Upon receiving responses to the queries, the process may analyze the returned information and identify the network resources, their characteristics, operating states, etc., verify network configurations and identify any changes, and may store and/or report the results. The discovery process may employ predetermined external or internal information about different resources, and may be based upon discovery parameters that define the types of information and level of discovery desired. The discovery parameters may be predefined, dynamically generated, or provided by a user.

The invention preferably employs a two-phase discovery process. Referring to FIG. 2, during a first phase 202 the system performs quick discovery to identify the NUT network resources and infrastructure and retrieve the system attributes of resources, such as, for example, SNMP version, vendor name, device type, hostnames, MAC address, operating system (OS) type and version, serial number, hardware version, firmware version, software version, image version, etc. During a second full discovery phase 204, the system discovers the states and operational characteristic of the resources and may identify and report changes. As shown in FIG. 2, discovery parameters may be input to the process at 210. At 212, quick discovery command packets that are designed to query resources of the network (NUT) are constructed and sent out to a particular IP address within a range of input IP addresses to identify a resource and retrieve system attributes of the resource. At 214, a response to the quick discovery command packet is returned from the resource and stored for subsequent analysis to characterize the resource and to determine the infrastructure configuration of the network. At 216, if there are other IP addresses in the range that are to be sent, the quick discovery process 202 is repeated until all network resource addresses have been discovered.

During the second full discovery phase 204, other discovery command packets are generated and sent out to each of the resource addresses to gather additional information to identify their states, configurations, etc. At 218, discovery command packets may be sent to a resource, and the responses analyzed and stored at 220. At 222, the discovery results may be compared with previous baseline results for the resource, and any changes from previous results may be identified and reported. At 224, it is determined whether there are additional resources whose current states and configurations are to be discovered during the current discovery cycle. If so, the appropriate discovery parameters are set at 226, and the discovery process 204 is repeated. If it is determined at 224 that the states and characteristics all network resources have been determined, a decision is made at 230 whether to repeat either discovery phase 204 or both phases 202 and 204. Discovery phase 204 may be repeated substantially continuously, at predefined intervals or upon user command to maintain current up-to-date information on the network and resources. Discovery phase 202 which discovers any changes to network resources or network configurations may be repeated at the same or at different times as discovery phase 204.

Figure 3:
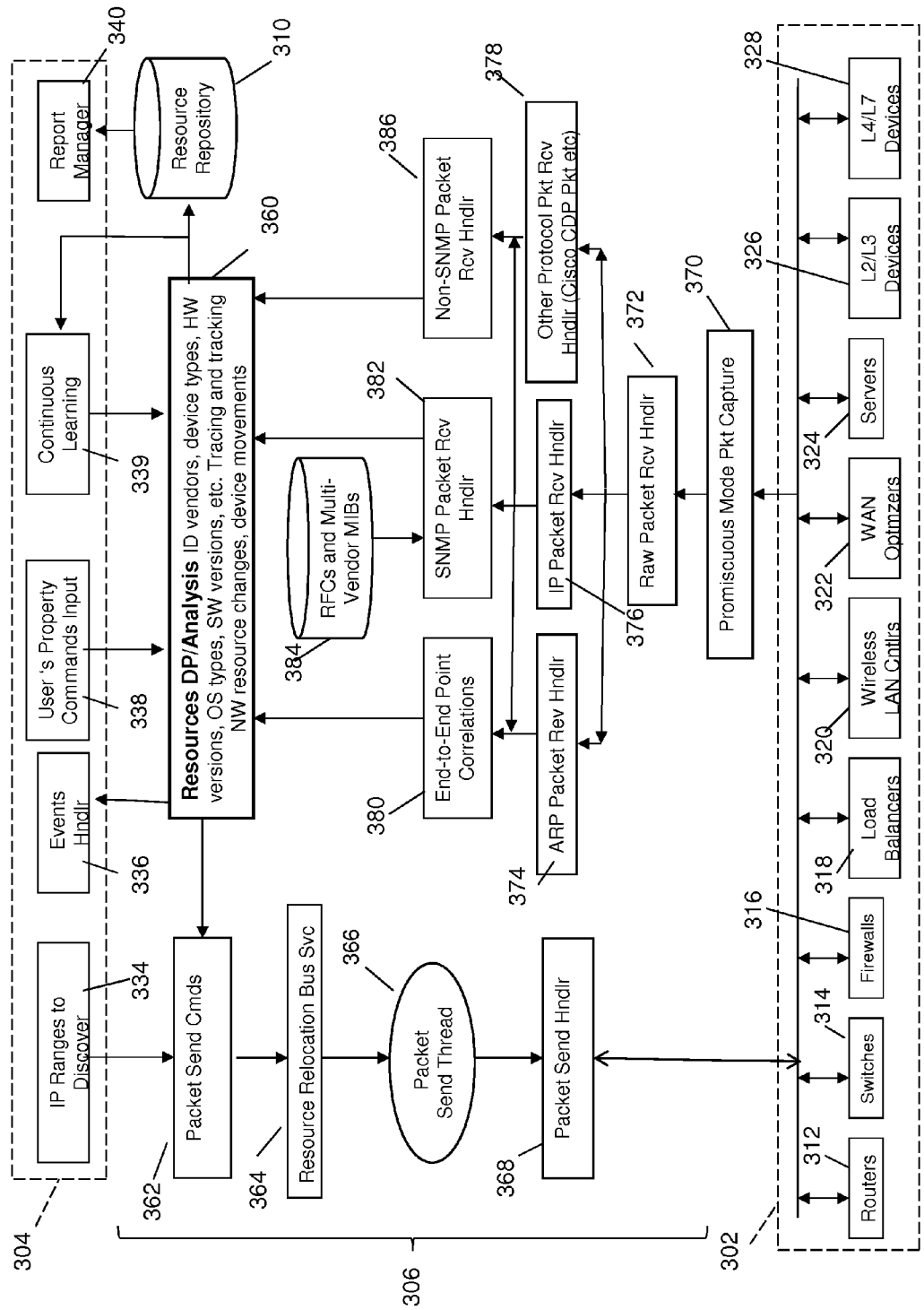
FIG. 3 is a block diagram illustrating in more detail a resource discovery and analysis system and process in accordance with the invention.

In a preferred embodiment, the invention may repeat the foregoing discovery and analysis process substantially continuously, at periodic intervals, or upon the occurrence of predetermined events to maintain current up-to-date information about the operations and state of the network and its resources. Subsequent discovery/analysis processes may be performed using either the same or different discovery parameters, e.g., discovery levels (to be described more fully below). Accordingly, following steps 224 and 230, the discovery and analysis process may be repeated using the same or different parameters. Each time the process is repeated, the results may be time stamped and saved, and used to identify trends and evolving problems. The resource discovery process of the invention may, in one form, be established as a centralized service to discover resources in small networks. In another form it may be established as a distributed service comprising several distributed discovery processes or agents operating under the control of a master service for discovering large networks. FIG. 3 illustrates in more detail an embodiment of a discovery and analysis system in accordance with the invention for discovering, identifying and analyzing the states and configurations of resources in a network infrastructure 302 in order to characterize the resources and the network. The components of the system may be implemented in hardware, software or combinations of hardware and software configured to perform the operations and functions described.

As shown in the figure, the system includes an interface subsystem 304 that may enable discovery parameters and information to be input to and information and results to be received from the system, a data processing and analysis (DP & Analysis) subsystem 306 that generates and issues command packets (queries) to the network infrastructure 304 to interrogate the network resources, and a resource repository 310 for storing information and results. Network infrastructure 302 resources may comprise multi-vendor, multi-class and multi-level physical, logical and virtual resources including, among other resources, routers 312, switches 314, firewalls 316, load balancers 318, wireless LAN controllers 320, WAN optimizes 322, servers 324, L2/L3 devices 326, L4/L7 devices 328, etc.

The interface (I/F) subsystem 304 may include a variety of different modules and resources. These may include a module 334 that enters into the DP & Analysis subsystem 306 discovery parameters, such as IP address ranges to be searched to discover resources. The parameters may be entered into module 334 via a user interface, e.g., a GUI (not shown), or via external imported files. An events handler 336 of subsystem 304 may receive and process user-defined events and provide notifications upon the occurrence of the events, as will be described. A user's property commands input module 338 may read and execute instructions from external property files that provide information useful for the discovery and analysis. This enables, for example, external non-common configuration attributes to be imported and used in the discovery and analysis process so that the resource DP & Analysis subsystem 306 is easily scalable without the necessity of recompiling subsystem software. Examples of property command files that may be imported include:

a. Vendor name properties that instruct the subsystem to identify vendor-related attributes of resources;
 b. Discovery properties including timeout parameters, hiding or showing DP & Analysis subsystem self-IP address, running 32-bit or 64-bit CPU's, etc.;
 c. Management Information Base (MIB) properties for managing resources in the network, as, for example, instructing the system to selectively enable or disable SNMP processing;
 d. New device properties to support new devices released by vendors; and
 e. Operating system (OS) properties and command sets to support new operating systems released by vendors.

The I/F subsystem 304 may further include a continuous learning intelligent module 339 comprising a processor and physical computer readable media embodying instructions for controlling the processor, or otherwise operating under the control of the DP & Analysis subsystem 306 (which will be described below) such that it learns through use, thereby decreasing the necessity of entering parameters into the DP & Analysis subsystem 306. During the discovery process, the analysis subsystem communicates with target devices in the network using a variety of protocols and credentials. Thereafter, the instructions may control the processor as will be described so that the continuous learning module perform operations such as to:

a. Select, determine and memorize valid credentials from input lists, and bind them to their target devices. The credentials may include protocol types, user names and passwords, SNMP read-only and read-write community strings, etc.;
 b. Read external properties files for new OS types and related commands for new software versions without the necessity of recompiling the DP & Analysis subsystem source code;
 c. Remember progress for self-restart to resume an interrupted discovery process due, for example, to a power outage; and
 d. Self-adjust secure shell (SSH) connection timeouts according to the types of operations and data transfer sizes involved.

The I/F subsystem 304 may additionally include a report manager 340 configured to read information from the resource repository 310, and generate, display and export pre-defined and custom reports, such as management reports, technical reports and compliance reports. The report manager may comprise an intelligent module having a processor and memory storing control instructions for the processor, or may operate under the control of the DP & Analysis subsystem 306 to perform these functions.

The data processing and analysis (DP & Analysis) subsystem 306 is responsible for interrogating (querying) and receiving responses from target resources in the network to discover and analyze the network and resources to characterize the resources and the network. As described in more detail below, the subsystem may be controlled by a computer system 360 that utilizes industry standard and vendor specific information to analyze a network infrastructure to discover and identify resource vendors, types, hardware/device models and versions, operating systems and application software versions, resource operating states, configurations, network topology including connections between device ports, etc. The system and process may repeatedly discover and analyze the network infrastructure substantially continuously, at periodic intervals, or on command, and trace and track network resources in real time to detect changes in resources, operations and network configurations. The functions of the data processing and analysis subsystem 306 may be embodied in a system on a node of the infrastructure of the NUT, distributed across multiple nodes of the NUT, or be external to the NUT. It may, for example, be cloud based as described above in connection with FIG. 1.

Figure 4:
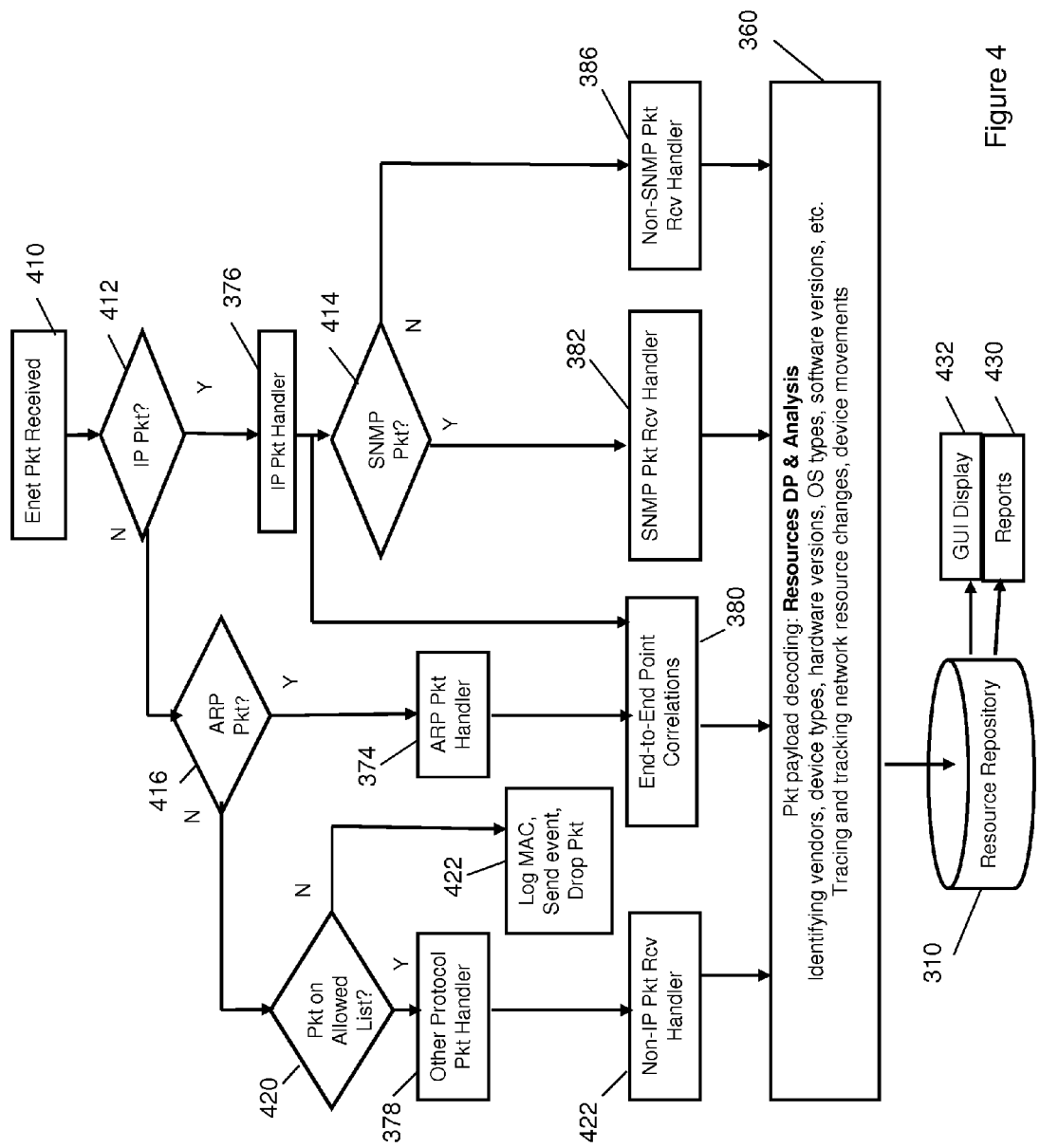
FIG. 4 is a block diagram illustrating in more detail the processing of information response packets received from resources in an network infrastructure.

FIGS. 3 and 4 illustrate a preferred embodiment of a system and method for performing data processing and analysis operations in accordance with the invention. Referring to FIG. 3, the DP & Analysis subsystem 306 comprises the Resources DP/analysis computer system 360, which may including a single or multi-processor CPU, input/output and network interfaces, and associated non-transitory computer readable medium, e.g., one or more memory devices, for storing executable instructions for controlling the CPU to perform processing and analysis operations in accordance with the invention. The computer system may run a single or multiple processing threads, and may operate as a centralized service or distributed services.

DP & Analysis subsystem 306 may utilize predetermined or dynamically generated discovery parameters that establish the scope and level of discovery to generate and issue command packets to query network resources, receive response packets returning information responsive to the command packets, and analyze the response packets to identify and characterize the resources and the network. IP address ranges that are to be used for discovery may be entered into module 334, as previously described. There may be a plurality of different ranges, each range comprising a starting IP address, e.g., 192.168.1.10, and an ending IP address, e.g., 192.168.2.100. The IP address ranges may be supplied to a packet send commands module 362 from module 334, for example. The packet send command module 362 uses the IP addresses and internal commands of a command set supplied from the Resources DP/analysis computer system 360 to send internal commands to a resource relocation bus service (RRBS) 364. As described below, the RRBS may insert processing thread information for a resource into the internal command packet, and forward the internal command packet to a packet send thread module 366 which converts the internal discovery command into an external (infrastructure) discovery command. The external discovery command is provided to a packet send handler 368 that forms an Ethernet (Enet) packet that is sent to resources of the network infrastructure 302.

The following is an example of an internal command set from which executable external discovery command packets may be generated and sent for processing to multiple processing threads:

| Command Index | Command | Command Execution |
|---|---|---|
| 1 | NS_MSG_COMMAND_INDS_START | Start discovery |
| 2 | NS_MSG_COMMAND_INDS_STOP | Stop discovery |
| 3 | NS_MSG_COMMAND_INDS_SHUTDOWN | Shutdown and exit discovery |
| 4 | NS_MSG_COMMAND_INDS_VERSION | Get current running discovery software version |
| 5 | NS_MSG_COMMAND_INDS_STATUS | Get current running discovery software status |
| 6 | NS_MSG_COMMAND_INDS_REFRESH | Refresh current discovery software memory |

The resource relocation bus service 364 may identify and insert appropriate processing thread information into the internal discovery packet received from the packet send commands module 362. It may do this by decoding the internal packet command header for handling to the appropriate service, by providing a software routing service according to a packet's origin IP address, target IP address, source IP address and destination IP address, and an assigned processing thread, and forward the command to the packet send thread module 366 which builds the external discovery command packet according to the desired level of discovery. As will be described, there may be different levels of discovery that can be configured by users. The different discovery levels may interrogate the network resources for different kinds of information which the DP & Analysis subsystem 306 processes to characterize the resources in the network infrastructure.

Figure 5:
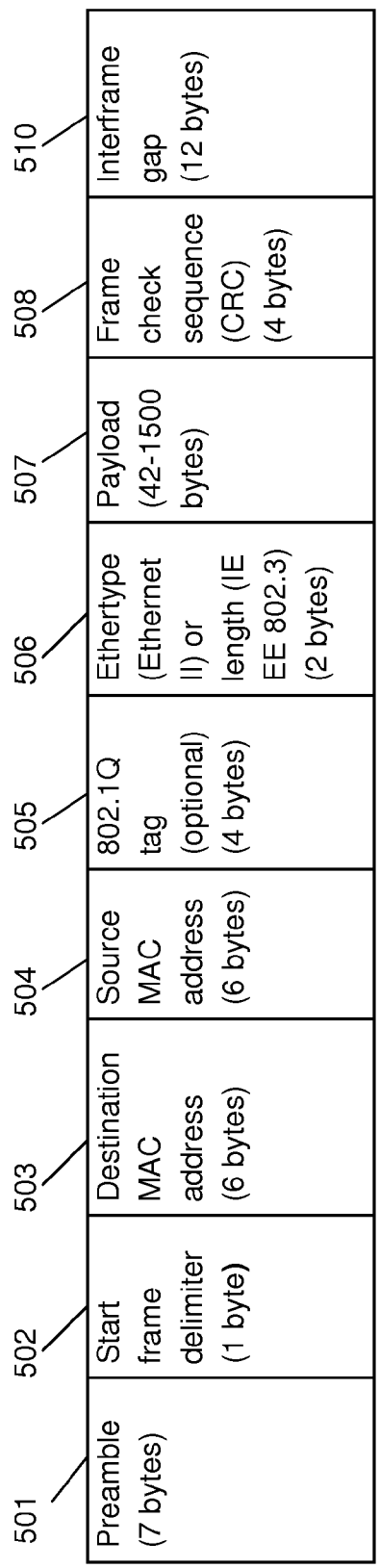
FIG. 5 is a diagrammatic view of the frame structure of an Ethernet packet of the type which may be used by the invention.

The packet send thread 366 receives the internal command packets RRBS 364, converts them onto external command discovery packets, and sends the discovery packets to a packet send handler 368. The packet send handler converts the external discovery command into network discovery packets having an Enet format as shown in FIG. 5, by adding a packet header and packet payload, and sends packets to the network target resources. The packets may be sent internally via multiple threads within one system 306, or may be sent externally to multiple other distributed systems. The external command packets from the packet send thread that are sent to the packet send handler may have the following format:

Header [0]: Source IP address
    Header [1]: Source port number
    Header [2]: Source server port number
    Header [3]: Source host name
    Header [4]: Destination IP address
    Header [5]: Destination port number
    Header [6]: Destination server port number
    Header [7]: Destination host name
    Header [8]: Timestamp
    Header [9]: Message version
    Header [10]: Message ID
    Header [11]: Origin IP address
    Header [12]: Origin port number
    Header [13]: Origin server port number
    Header [14]: Origin hostname
    Header [15]: Target IP address
    Header [16]: Target port number
    Header [17]: Target server port number
    Header [18]: Target host name
    Header [HeaderSize-1]: Message Command The packet payload format may be:
    Type of operation: Unknown (0), Get (1), Set (2), Ack (3), Trap (4);
    Length of the payload; and
    Value of the payload.

The numbers in square brackets of the header may be indices of the packet header array, and the numbers in parenthesis in the packet payload may correspond to particular system operations. The network discovery packets from the packet send handler may include, for instance, an SNMP get-request packet to retrieve an interface table from a target resource. The response packet containing the interface table can be decoded and processed by the DP & Analysis subsystem 306. The interface table indicates the source and destination interfaces to the target device, and may be used with interface tables from the other network resources to build a network configuration matrix that indicates the interconnections of all network resources.

In a preferred embodiment, there may be four levels of discovery: basic, advanced, expert and ultimate. Discovery levels may be selectively used for different iterations of the discovery and analysis process. Basic discovery, which may include the first discovery phase 202 in FIG. 2, may perform discovery functions such as: (i) detect a target resource's accessibility using its IP address; (ii) detect the SNMP version of the device; (iii) detect the vendor's name and device type from the target device; (iv) obtain system attributes of the device such as hostname, MAC address, OS type, OS version, device serial number, hardware version, firmware version, software version, image version, etc.; and (v.) perform auto-grouping by automatically assigning devices to factory default and user-specified groups. Advanced discovery, which is part of discovery phase 204 of FIG. 2, may obtain OSI Layer 2 data such as MAC data, ARP data, interface data, forwarding data, VLAN data, etc.

Expert discovery, which comprises multi-vendor, multi-class discovery, may obtain a device's vendor and class related data using vendors' proprietary protocols or specific SNMP management information bases (MIBs). MIBs, as are well known, comprise databases of management information objects for managing resource entities in a communications network. Vendors may include manufacturers such as Cisco, Juniper/NetScreen, Brocade/Foundry, etc., and resources entities may comprise devices such as routers, switches, load balancers, firewalls, LAN controllers, etc. Ultimate discovery may obtain OSI Level 3 and Layers 4-7 data. The data may include, for instance, information on IP routing, server farms, real servers, virtual servers, load balancing, Secure Socket Layer (SSL), high availability, policy mapping, etc.

As described above, the discovery and analysis process performed by the DP & Analysis subsystem may obtain information from the network infrastructure as to the states of physical, logical and virtual resources. The data may include the initial states and runtime states of resources, and is preferably time-stamped and logged to permit detection of state changes and infrastructure topology changes as when resources are added, removed, or relocated. Processed data, discovery baselines, etc., may be stored in the resource repository 310, and may be used as references to which new ongoing discovery information may be compared to determine changes. In the event of a network failure, the stored baseline data is available to restore the network and its operations.

The DP & Analysis subsystem may also communicate with the events handler 336 of the I/F interface 304. The events handler may provide event notifications for user-defined events. These may include notifications such, for example, as when configuration retrieval fails for any resource; when a resource's status is changed to inactive or to active; when a configuration download to a resource fails; when any service is halted; when any configuration change service starts; when the configuration is changed for selected resources; when the system needs attention; and provide selected user reports at specified frequency.

The discovery packets from the packet send handler 368 may be sent, e.g., unicast, to target resource IP addresses in the network 302. The targets may be identified during the quick discovery phase 202 (FIG. 2) by broadcasting ARP packets to all devices to discover L2 characteristics, and unicasting pings to each IP address in the input IP address ranges to discover L3 characteristics. A target resource having a broadcast ARP address will respond with its MAC address. The responses resolve addresses and are preferably cached. Thereafter, the resolved addresses are used by the packet send handler 368 of the DP & Analysis subsystem 306 to send out discovery commands for other higher levels of network discovery as to a target device's status, etc.

During network discovery, the subsystem 306 will send out discovery packets to each network target resource, and each target resource will respond to the DP & Analysis subsystem 306 by generating and returning relevant response packets. The response packets, comprising Ethernet (Enet) packets, for each target resource may be sent from a network interface card or wireless interface network controller of the target resource and may be received by a promiscuous mode packet capture module 370. The promiscuous mode packet module is preferable a dual-homed host, meaning it has two network interfaces. A primary interface may be configured to run in promiscuous mode, meaning it forwards all packets received to a raw packet receiver handler 372 regardless of whether a response packet header has a destination address. The second interface may be configured for secure access.

FIG. 5 illustrates the standard I.E.E.E. 802.3 Ethernet (Enet) frame structure of the sending and receiving packets. As shown, the frame structure has eight groups (501-508) of bytes. The groups vary in size, having different numbers of bytes, as indicated in the figure. A ninth group 510 of 12 bytes serves as an inter-frame separator between frames. The raw packet handler 372 receives the packets from module 370, determines the type of each packet (as will be described), and forwards the packet to an appropriate packet handler. ARP response packets used for resolving network layer addresses into data link addresses are forwarded to an ARP packet handler 374. IP packets are forwarded to an IP packet handler 376, and other non-standard protocol packets such as Cisco CDP packets, etc., may be forwarded to a packet handler 378. At 380 hash tables may be built for end-to-end point correlations for the received packets. An SNMP packet handler 382 may receive and analyze SNMP packets for SNMP versions v1, v2 and v3 using IETF RFCs and vendor MIBs from runtime storage 384; and a non-SNMP packet handler 386 may process non-SNMP packets such as Cisco CDP packets, etc. The packet handlers 380, 382 and 386 may forward processed packets to the DP & Analysis subsystem 360 for processing as previously described.

FIG. 4 illustrates in more detail the processing of Enet packets received from the network by the packet handlers 372-378. As shown, upon an E-net packet being received at 410, a determination is made at 412 whether the packet is an IP packet or an ARP packet based upon the Enet packet field 506. If field 506 is hexadecimal <0x0800>, the packet is an IP packet. If the field is <0x0806>, the packet is an ARP packet. If it is an IP packet, it is sent to the IP packet handler 376, and a determination is made at 414 whether the packet is an SNMP packet. If the packet is an IP packet and the IP header protocol field is 0x11 indicating an UDP packet and the UDP header's destination port is <161> it is an SNMP packet. If it is an SNMP packet it is sent to SNMP packet handler 382. Otherwise it is sent to the non-SNMP handler 386. At 412, if the packet is determined not to be an IP packet, a decision is made at 416 whether the packet is an ARP packet, based upon the Enet packet field 506, as described above. If so, the packet is forwarded to the ARP packet handler 374 and to the end-to-end point correlation module 380. The end-to-end point correlation operation resolves the target device's end-to-end point correlations based upon its ARP table, IP routing table, and a stored correlation table determined for discovery. When an ARP packet or an IP packet is received from a discovered target device, it is sent to and handled by the ARP packet handler 374 or the IP packet handler 376, as appropriate. The ARP or IP source address and destination address may be used to index an ARP table, an IP route table and a correlation table to confirm the device's active status. Any changes, such as "newly added", "active-to-inactive", or "removed" will cause changes in the end-to-end point correlations.

If at 416 the packet is determined not to be an ARP packet, a determination is next made at 420 whether the packet is on an allowed list. The allowed list is a filter for security and performance purposes. It may be a predetermined list containing information such as sender's addresses, protocols, source port numbers, etc. If the packet is not on the allowed list, the MAC information from the packet is logged at 422 and the packet is disregarded. Additionally, an alert event may be sent to the event handler 336. Otherwise, the packet is sent to the other protocol packet handler 378 and to a non-IP packet handler process 422, which may be a function of other protocol handler 376 and non-SNMP handler 386. The process 422 may handle a pool of any non-standard protocol packets, for example, Cisco CDP packets. The outputs of the packet handlers 382, 386 and 422 and the end-to-end point correlations 380 are supplied to the computer system 360 for processing and analysis to characterize the network infrastructure, as previously described. The Resources DP & analysis computer system may decode response packets and identify vendors of target devices, device types, device hardware and software versions, operating system, operational status, etc. The computer system may also use baseline information in the repository 310 to trace and track network resource changes and movements. The results may be stored in the resource repository 310 and used to provide reports 430 and to a user display 432.

From the foregoing, it may be seen that the invention provides an efficient automated approach to real-time monitoring of a network infrastructure that has heretofore been unavailable. The invention can easily detect changes in the operations, states and configurations of resources, as well as in the network infrastructure topology, and it enables operations to be readily restored in the event of failures.

While the foregoing has been with reference to particular preferred embodiments of the invention, it will be appreciated that changes may be made to these embodiments without departing from the principles and spirit of the invention, the scope of which is defined in the appended claims.

The invention claimed is:

1. A computer-implemented method of real-time discovering and monitoring of a data communications network having a plurality of multi-vendor, multi-class, multi-layer network devices, comprising:
 receiving properties command information about attributes of network devices to be discovered, said properties command information comprising non-standard configuration attributes, vendor specific attributes, and credentials including user names and passwords for each of said network devices;
 sending a plurality of first discovery commands to ping a plurality of network addresses within a selected network address range, the first discovery commands being formed to query each of said plurality of network devices within said selected address range and cause each network device that responds to respond with its network IP address and a corresponding MAC address;
 receiving responses to said first discovery commands from responding network devices and determining from the responses a packet type for each responding network device;
 sending a second discovery command to the network address of each responding network device, said second discovery command comprising said credentials for said each responding network device and being formed to query said each responding network device about information stored in each such network device as to end-to-end Open System Interconnect Level 2 and Level 3 interconnections between the responding network device and other network devices, and formed to discover first characteristics including device identity, device type and information on an installed hardware and software operating system for said each responding network device;
 analyzing responses to said discovery commands from each of said plurality of network devices to discover said first device characteristics and to determine a first network configuration;
 repeating said sending said first and second discovery commands, said receiving responses to said discovery commands and said determining said packet type to discover second characteristics of each of said network devices and to identify second interconnections between each network device and other ones of said network devices to determine a second network configuration; and
 comparing the first and second characteristics of said network devices and the first and second network configurations to identify and track any changes in said network devices and network configuration.

2. The method of claim 1, wherein said first discovery commands are formed to cause each of said responding network devices to return an address resolution protocol packet that identifies said network IP addresses and said MAC addresses of said responding network devices, and building end-to-end point correlations from received packets that identify interconnections between each responding network device and other network devices to indicate a network topology.

3. The method of claim 1, wherein said network devices comprise physical, logical and virtual network resources, and said sending, said analyzing and said comparing are repeated automatically to capture sequences of information about said resources and to identify in real time any changes in network configuration or resource operating conditions.

4. The method of claim 1 further comprising constructing said discovery commands using externally supplied proprietary vendor commands or dynamically determined discovery parameters.

5. The method of claim 1, wherein said determining said packet type comprises determining from received packets a network operating protocol of each said responding network device, and processing each received packet in accordance with an operating protocol appropriate to such packet.

6. The method of claim 1 further comprising constructing said discovery commands to derive information about operating hardware and software of said devices.

7. The method of claim 1 further comprising learning and memorizing credentials for each of said devices, and binding the credentials to associated devices.

8. The method of claim 1, wherein said discovery commands are constructed to query said devices about different pre-selected device characteristics.

9. The method of claim 1 further comprising saving discovered characteristics and network configurations with timestamps to identify changes at selected times, wherein said sending, said discovery commands and said receiving and said analyzing responses are performed concurrently on said network devices via a plurality of processing threads.

10. The method of claim 1, wherein said method is implemented as one of a centralized process for small networks, or as a plurality of distributed processes under the control of a master process for a large network.

11. A computer product comprising non-transitory computer readable media embodying instructions for controlling the operation of a computer to perform a method to discover and monitor in real time a data communications network having a plurality of multi-vendor, multi-class, multi-layer network devices, comprising:
 receiving properties command information about attributes of network devices to be discovered, said properties command information comprising non-standard configuration attributes, vendor specific attributes, and credentials including user names and passwords for each of said network devices;
 sending a plurality of first discovery commands to ping a plurality of network addresses within a selected network address range, the first discovery commands being formed to query each of said plurality of network devices within said selected address range and cause each network device that responds to respond with its network IP address and a corresponding MAC address;

receiving responses to said first discovery commands received from responding network devices and determining from the responses a packet type for each responding network device;

sending a second discovery command to the network address of each responding network device, said second discovery command comprising said credentials for said each responding network device and being formed to query said each responding network device about information stored in each such network device as to end-to-end Open System Interconnect Level 2 and Level 3 interconnections between the network device and other network devices, and formed to discover first characteristics including device identity, device type and information on an installed hardware and software operating system for said each responding network device;

analyzing responses to said discovery commands from each of said plurality of network devices to discover said first device characteristics and to determine a first network configuration;

repeating said sending said first and second discovery commands, said receiving responses to said discovery commands and said determining said packet type to discover second characteristics of each of said network devices and to identify second interconnections between each network device and other ones of said network devices to determine a second network configuration; and comparing the first and second characteristics of said network devices and the first and second network configurations to identify and track any changes in said network devices and network configuration.

12. The computer product of claim 11, wherein said first discovery commands are formed to cause said responding network devices, and to return an address resolution protocol packet that identifies said network IP addresses and said MAC addresses of the responding network devices, and building end-to-end point correlations for received packets that identifies interconnections between each responding network device and other network devices to indicate a network topology.

13. The computer product of claim 11, wherein said network devices comprise physical, logical and virtual network resources, and said sending, said analyzing and said comparing are repeated automatically to capture sequences of information about said resources and to identify in real time any said changes in network devices or network configuration.

14. The computer product of claim 11, further comprising constructing said discovery commands using externally supplied proprietary vendor commands or dynamically generated discovery parameters.

15. The computer product of claim 11 further comprising constructing said discovery commands to derive information about operating hardware and software of said devices.

16. The computer product of claim 11 further comprising learning and memorizing credentials for said devices, and binding the credentials to associated devices.

17. The computer product of claim 11, wherein said method is performed in one of a data center, an enterprise network or a cloud.

18. A system for real time discovering and monitoring of a data communications network having a plurality of multi-vendor, multi-class, multilayer network devices, comprising:

a computer system configured for:

receiving properties command information about attributes of network devices to be discovered, said properties command information comprising non-standard configuration attributes, vendor specific attributes, and credentials including user names and passwords for each of said network devices;

generating and sending to said network devices first discovery commands comprising Ethernet packets for discovery of network address information for to ping a plurality network addresses within a selected address range, the first discovery commands being formed to Query each of said plurality of network devices within said selected address range and cause each network device that responds to respond with its network IP address and a corresponding MAC address;

receiving responses from said responding network devices to said first discovery commands and associating with each received response a network address of the determining a packet type for each responding network device;

sending a second discovery command to the discovered network address for each responding network device;

the second discovery command comprising a second Ethernet network discovery packet having a network protocol corresponding to such responding network device, the network discovery packet embodying commands that said credentials for said each responding network device and being formed to query the responding network device for information as to physical address, operating configuration of each said responding network device, and attributes comprising about information stored in the responding network device as to end-to-end Open System Interconnect Level 2 and Level 3 interconnections between said responding network device and other network devices, and to discover first characteristics including a device identity, type and an installed hardware and software operating system and software installed on of each such responding network device;

analyzing response packets from said plurality of network devices to determine operating parameters of each network device and to identify interconnections between each network device and other network devices to determine said first characteristics and a first network configuration; and comparing said determined operating parameters first characteristics of said network devices and said first network configuration with previous baseline operating parameters characteristics of said network devices and a previous network configuration to detect changes in the network.

19. The system of claim 18 further comprising a plurality of packet receive handlers receiving response packets from said network devices, each handler formed to handle a different packet type, and the receive handler that processes said response packet processing being formed to forward the response packet to the computer system for analysis.

* * * * *